United States Patent
Paggios et al.

(10) Patent No.: US 10,321,698 B2
(45) Date of Patent: Jun. 18, 2019

(54) CHOCOLATE PRODUCT AND PROCESS FOR PRODUCING THE SAME

(75) Inventors: Konstantinos Paggios, Kreuzlingen (CH); Martin Thiele, Holzkirchen (DE); Hartmut Balzer, Petershausen (DE); Stephen Pearson, Hohenbrunn (DE)

(73) Assignee: Kraft Foods R&D, Inc., Deerfield, IL (US)

( * ) Notice: Subject to any disclaimer, the term of this patent is extended or adjusted under 35 U.S.C. 154(b) by 820 days.

(21) Appl. No.: 14/344,541

(22) PCT Filed: Sep. 10, 2012

(86) PCT No.: PCT/US2012/054432
§ 371 (c)(1),
(2), (4) Date: Sep. 19, 2014

(87) PCT Pub. No.: WO2013/039831
PCT Pub. Date: Mar. 21, 2013

(65) Prior Publication Data
US 2015/0024109 A1    Jan. 22, 2015

(30) Foreign Application Priority Data
Sep. 12, 2011 (EP) .................... 11180877

(51) Int. Cl.
*A23G 1/32* (2006.01)
*A23G 1/36* (2006.01)
(Continued)

(52) U.S. Cl.
CPC ............ *A23G 1/32* (2013.01); *A23G 1/0033* (2013.01); *A23G 1/0036* (2013.01);
(Continued)

(58) Field of Classification Search
CPC .................................. A23G 1/32; A23G 1/40
(Continued)

(56) References Cited

U.S. PATENT DOCUMENTS 2,760,867 A * 8/1956 Kempf ...................... A23G 1/30
                                                                426/331
2,904,438 A * 9/1959 O'Rourke .............. A23G 1/305
                                                                426/334
(Continued)

FOREIGN PATENT DOCUMENTS

| CH | 410607 | 3/1966 |
|---|---|---|
| CN | 1229599 | 9/1999 |

(Continued)

OTHER PUBLICATIONS

International Preliminary Report on Patentability and Written Opinion in corresponding International Application No. PCT/US2012/054432 dated Mar. 12, 2014, 7 pages.
(Continued)

*Primary Examiner* — Jeffrey P Mornhinweg
(74) *Attorney, Agent, or Firm* — Fitch, Even, Tabin & Flannery, LLP

(57) ABSTRACT

The present invention relates to a process for the manufacture of a chocolate product involving the use of hydrated salt, hydrated sugar or hydrated sugar alcohol in the underlying chocolate mass and comprising the steps of refining, conching and optionally tempering of the chocolate mass. The invention further relates to a chocolate product comprising a chocolate mass comprising certain weight proportions of hydratable salt, hydratable sugar or hydratable sugar alcohol, as obtainable by the process of the invention.

9 Claims, 1 Drawing Sheet

(51) Int. Cl.
   *A23G 1/38* (2006.01)
   *A23G 1/40* (2006.01)
   *A23G 1/00* (2006.01)

(52) U.S. Cl.
   CPC ............ *A23G 1/0046* (2013.01); *A23G 1/36* (2013.01); *A23G 1/38* (2013.01); *A23G 1/40* (2013.01)

(58) Field of Classification Search
   USPC ........................................................ 426/631
   See application file for complete search history.

(56) References Cited

U.S. PATENT DOCUMENTS

| | | | |
|---|---|---|---|
| 3,218,174 | A | 11/1965 | Schubiger et al. |
| 4,045,583 | A | 8/1977 | Jeffery et al. |
| 4,081,559 | A | 3/1978 | Jeffery et al. |
| 4,157,405 | A | 6/1979 | Yasuda |
| 4,440,797 | A | 4/1984 | Berkes et al. |
| 4,963,372 | A | 10/1990 | Zumbe |
| 4,980,192 | A | 12/1990 | Finkel |
| 5,120,566 | A | 6/1992 | Baba et al. |
| 5,149,560 | A | 9/1992 | Kealey et al. |
| 5,160,760 | A | 11/1992 | Takemori et al. |
| 5,238,698 | A | 8/1993 | Zumbe et al. |
| 5,244,690 | A | 9/1993 | Van der Schueren et al. |
| 5,360,621 | A | 11/1994 | Mentink |
| 5,464,649 | A | 11/1995 | St John et al. |
| 5,468,509 | A | 11/1995 | Schlup et al. |
| 5,474,795 | A | 12/1995 | Surber |
| 5,486,376 | A | 1/1996 | Alander et al. |
| 5,709,903 | A | 1/1998 | St. John et al. |
| 5,882,709 | A | 3/1999 | Zumbe |
| 5,976,605 | A * | 11/1999 | Van Der Schueren .. A23G 1/40 426/631 |
| 5,989,619 | A | 11/1999 | Zumbe |
| 6,117,478 | A | 9/2000 | Dubberke |
| 6,165,540 | A | 12/2000 | Traitler et al. |
| 6,261,627 | B1 | 7/2001 | Armstrong |
| 6,488,979 | B1 | 12/2002 | Davila et al. |
| 7,727,574 | B1 | 6/2010 | Ushioda |
| 2004/0161511 | A1* | 8/2004 | Peterson ............. A23G 1/0016 426/392 |
| 2006/0153966 | A1 | 7/2006 | Simburger |
| 2007/0259070 | A1 | 11/2007 | Song et al. |
| 2008/0311279 | A1* | 12/2008 | Kortum .................. A23G 1/305 426/660 |
| 2009/0238941 | A1 | 9/2009 | Hussain |
| 2010/0183772 | A1 | 7/2010 | Clanton |

FOREIGN PATENT DOCUMENTS

| | | |
|---|---|---|
| CN | 1083666 | 4/2002 |
| CN | 1229599 | 11/2005 |
| EP | 0940085 | 9/1999 |
| EP | 0958747 | 11/1999 |
| EP | 1673977 | 6/2006 |
| EP | 2233014 | 9/2010 |
| EP | 2272377 | 1/2011 |
| EP | 2567622 | 3/2013 |
| GB | 1000159 | 8/1965 |
| WO | 1993012664 | 7/1993 |
| WO | 1995018541 | 7/1995 |
| WO | 1996022696 | 8/1996 |
| WO | 2008007938 | 1/2008 |
| WO | 2014052312 | 4/2014 |

OTHER PUBLICATIONS

International Search Report and Written Opinion, International Patent Application No. PCT/US2012054432, 10 pages.
Stortz et al., "Heat resistant chocolate," Trends in the Food Science & Technology, 2011 (abstract).
Siegfried Bolenz, et al., "Fast conching for milk chocolate." European Food Research and Technology, 2003, vol. 218, pp. 62-67.
Blackie Academic & Professional, Edited by S. Beckett, "Industrial Chocolate Manufacture and Use", Second edition, 1994, 4 pp.
C. Aguilar et al., "Sensory Characteristics of Milk Chocolate with Lactose from Spray-Dried Milk Powder", Journal of Food Science, vol. 59, No. 6, 1994, 5 pp. (pp. 1239-1243).
Declaration (Second) of Steven Lee, Opposition of Australian Patent Application No. 2012308876, Aug. 1, 2017, 4 pp.
Declaration of Barry David Glazier with accompanying Exhibits BG-1-BG-12, Opposition of Australian Patent Application No. 2012308876, Mar. 2, 2017, 107 pp.
Declaration of Imola Zsigmond with accompanying Exhibit A, Opposition of Australian Patent Application No. 2012308876, May 24, 2016, 11 pp.
Declaration of Janelle Suzanne Borham with accompanying Exhibit JSB-01, Opposition of Australian Patent Application No. 2012308876, Aug. 2, 2017, 4 pp.
Declaration of John Lee with accompanying Exhibits JL-1-JL-12, Opposition of Australian Patent Application No. 2012308876, Feb. 22, 2016, 123 pp.
Declaration of Steven Lee with accompanying Exhibits Sl-01-SL04, Opposition of Australian Patent Application No. 2012308876, May 24, 2016, 24 pp.
Declaration of Steven Lee, Opposition of Australian Patent Application No. 2012308876, Aug. 1, 2017, 4 pp.
Dimick et al., "Formulation of Milk Chocolate Using Milkfat Fractions." Australian Journal of Dairy Technology, Dairy Industry Association of Australia, Melbourne, AU, vol. 51, No. 2, Oct. 1, 1996, pp. 123-126.
European Extended Search Report, European Application No. 11180876.2, dated Dec. 2, 2011, 9 pages.
European Extended Search Report, European Application No. 11180877.0, dated Nov. 24, 2011, 8 pages.
Gray, M. et al., "What Changes Occur in Chocoloate During Conching?", New Food Magazine, Mar. 6, 2006, 8 pp.
Hogenbirk, G., "Glucose and Lactose Influence on Characteristics of Chocoloate Flavored Coatings", The Manufacturing Confectioner, Oct. 1985, 6 pp. (pp. 27-34).
International Search Report and Written Opinion, International Patent Application No. PCT/US 12/54432, dated Nov. 23, 2012, 17 pages.
Leprino Foods, LE-PRO® LAC 451 Product Information Sheet, Mar. 8, 2010, 1 p.
Mohos, F.A., "Confectionery and Chocolate Engineering Principles and Applications", 2010, 3 pp.
Notice of Opposition of an Australian Patent Application No. 2012308876, dated Aug. 21, 2015, 3 pages.
Statement of Grounds & Particulars of Opposition, Opposition of Australian Patent Application No. 2012308876, Nov. 23, 2015, 19 pp.
Wiley-Blackwell Publishers, "Industrial Chocolate Manufacture and Use", Edited by Steve Beckett, 4th Ed., 2009, 21 pp.
European Extended Search Report, European Application No. 12832511.5, dated Sep. 30, 2015, 10 pages.
European Examination Report, European Patent Application No. 12832511.5, dated Jul. 13, 2018, 5 pages.
Opposition Decision, Opposition of Australia Patent Application No. 2012308876, Sep. 12, 2018,39 pp.
Blackie Academic & Professional, Edited by S. Beckett, "Industrial Chocolate Manufacture and Use", Fourth edition, 2009, pp. 199 and 244.
Non-Final Rejection, U.S. Appl. No. 14/344,551, dated Sep. 10, 2015, 11 pages.
Response to Non-Final Rejection, U.S. Appl. No. 14/344,551, dated Dec. 10, 2015, 7 pages.
Final Rejection, U.S. Appl. No. 14/344,551, dated Feb. 9, 2016, 15 pages.
Response to Final Rejection, U.S. Appl. No. 14/344,551, dated May 9, 2016, 14 pages.
Non-Final Rejection, U.S. Appl. No. 14/344,551, dated Dec. 14, 2016, 19 pages.

(56) References Cited

OTHER PUBLICATIONS

Response to Non-Final Rejection, U.S. Appl. No. 14/344,551, dated Mar. 14, 2017, 7 pages.
Final Rejection, U.S. Appl. No. 14/344,551, dated Mar. 24, 2017, 28 pages.
Response to Final Rejection, U.S. Appl. No. 14/344,551, dated Jul. 24, 2017, 10 pages.
Non-Final Rejection, U.S. Appl. No. 14/344,551, dated Oct. 2, 2017, 15 pages.
Response to Non-Final Rejection, U.S. Appl. No. 14/344,551, dated Jan. 2, 2018, 10 pages.
Final Rejection, U.S. Appl. No. 14/344,551, dated May 2, 2018, 19 pages.
Response to Final Rejection, U.S. Appl. No. 14/344,551, dated Oct. 2, 2018, 8 pages.

* cited by examiner

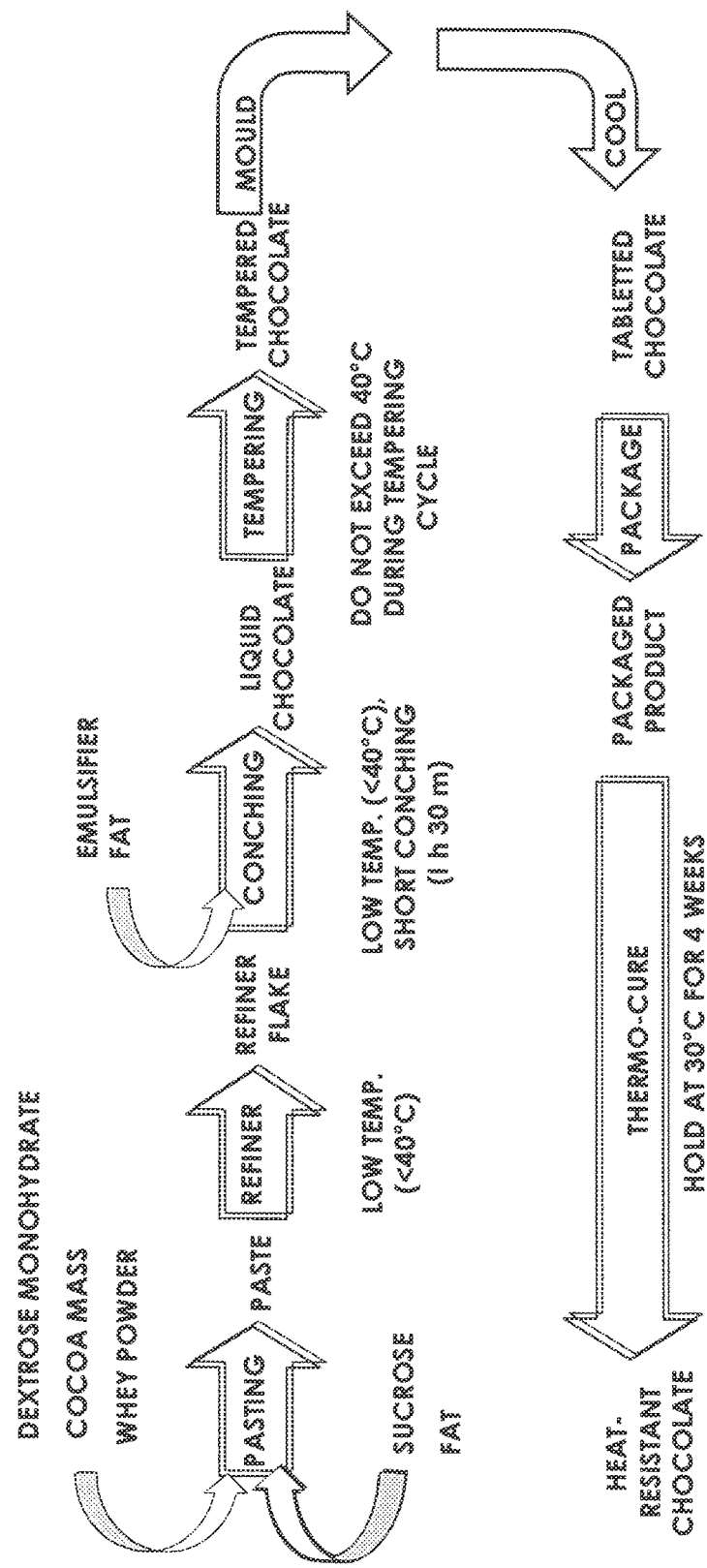

CHOCOLATE PRODUCT AND PROCESS FOR PRODUCING THE SAME

CROSS REFERENCE TO RELATED APPLICATIONS

This application is a U.S. national phase application of International Application No. PCT/US2012/054432, filed Sep. 10, 2012, designating the United States, which claims benefit from EP Application No. 11180877.0, filed Sep. 12, 2011, both of which are hereby incorporated herein by reference in their entireties.

FIELD OF THE INVENTION

The present invention is directed to a process for the manufacture of a chocolate product involving the use of a certain weight proportion of hydrated salt, hydrated sugar or hydrated sugar alcohol in the underlying chocolate mass and comprising the steps of refining, conching and optionally tempering of the chocolate mass. The invention is further directed to a chocolate product comprising certain weight proportions of hydratable salt, hydratable sugar or hydratable sugar alcohol, as obtainable by the process of the invention. The invention is particularly useful for the manufacture and provision of a heat-resistant chocolate product.

BACKGROUND OF THE INVENTION

Heat-resistant chocolate products containing chocolate or chocolate compound are of particular interest for consumers in countries with a hot climate, or during the hot seasons, where conventional chocolate products become soft and sticky when temperatures exceed 30° C. Heat-resistant chocolate products may be represented by solid chocolate tablets or bars as well as compounded or enrobed products such as chocolate-coated wafers, chocolate-containing biscuits or the like.

Various processes have been published which are said to provide heat-resistant chocolate products.

U.S. Pat. Nos. 6,488,979 and 4,980,192 describe methods for preparing heat-resistant chocolate by admixing a polyol, such as glycerol or sorbitol, with a conventional chocolate mass. One drawback of these methods resides in the short working time before the mixture is firming up.

U.S. Pat. Nos. 5,149,560, 5,160,760, 5,486,376 and 6,165,540 describe similar methods using water-in-oil emulsions. The use of an emulsified polyol is said to prolong the working time.

GB 1,000,159 discloses describes the manufacture of a heat resistant chocolate article by adding a first mass of sweetened non-conched chocolate, of which the greater part of the sugar is amorphous, to a second mass of conched chocolate containing sugar in crystalline form. The mass is conventionally tempered, followed by shaping and cooling. After hermetically wrapping, the product is stored for between 10 and 60 days at 20° C. and 35° C.

EP 1 673 977 discloses a process for manufacturing heat-resistant chocolate making use of an accelerated curing by microwaving.

U.S. Pat. No. 5,474,795 describes a reduced-fat chocolate product prepared using a sucrose fatty acid polyester in place of the conventional cocoa butter constituent and dextrose or blends of dextrose and sucrose in place of the conventional sweetener. The chocolate product is prepared by combining and refining the required ingredients and conching them at about 60 to 80° C.

It is an object of the present invention to provide a process which can, at similar or reduced, efforts and with conventional machinery, provide a chocolate product, such as chocolate in tablet (block) form or as a coating, with improved heat resistance, shelf-stability at elevated temperatures and sensory characteristics, or a balance thereof.

SUMMARY OF THE INVENTION

In a first aspect, the invention provides a process for the manufacture of a chocolate product comprising the steps of refining, conching and optionally tempering a chocolate mass which comprises
(A) one or more fats selected from cocoa butter, cocoa butter alternatives, milk fat and vegetable fats which are liquid at standard ambient temperature and pressure, wherein the total amount of the fats is 15 to 35 wt. %, and
(B) one or more of hydrated salts, hydrated sugars and hydrated sugar alcohols, wherein the total amount of hydrated salts, hydrated sugars and hydrated sugar alcohols is 1 to 15 wt. %,
wherein the temperature of the chocolate mass during refining, conching and optional tempering does not exceed 50° C.

In a second aspect, the invention provides a chocolate product comprising
(A) one or more fats selected from cocoa butter, cocoa butter alternatives, milk fat and vegetable fats which are liquid at standard ambient temperature and pressure, wherein the total amount of the fats is 15 to 35 wt. %, and
(B') one or more of hydratable salts, hydratable sugars and hydratable sugar alcohols, wherein the total amount of hydratable salts, hydratable sugars and hydratable sugar alcohols is 1 to 15 wt. %.

In a preferred embodiment of both the first and the second aspect of the invention, the chocolate product is heat-resistant. In another preferred embodiment of the invention, the chocolate product of the second aspect of the invention is obtained by the process of the first aspect of the invention.

BRIEF DESCRIPTION OF THE DRAWING

FIG. 1 is a process chart showing a specific working embodiment of the process of the invention.

DETAILED DESCRIPTION OF THE INVENTION

First Aspect of the Invention—Process

The process according to the first aspect of the invention generally comprises the steps of refining, conching and optionally tempering a chocolate mass comprising (A) one or more fats selected from cocoa butter, cocoa butter alternatives, milk fat and vegetable fats which are liquid at standard ambient temperature and pressure, wherein the total amount of the fats is 15 to 35 wt. %, and (B) one or more of hydrated salts, hydrated sugars and hydrated sugar alcohols, wherein the total amount of hydrated salts, hydrated sugars and hydrated sugar alcohols is 1 to 15 wt. %.

Component (A) in the invention encompasses cocoa butter, cocoa butter alternatives (CBAs), milk fat and vegetable fats which are liquid at standard ambient temperature and pressure (SATP, 25° C. and 100 kPa), wherein the total amount of the fats is 15 to 35 wt. %. CBAs include cocoa butter substitutes (CBSs), cocoa butter replacers (CBRs) and cocoa butter equivalents (CBEs) (the latter also including cocoa butter improvers (CBIs)).

Cocoa butter is the fat of the beans of the fruit of *Theobroma cacao*. It can be used as such so as to form component (A) or part thereof, or it can be added as part of a component comprising cocoa butter, such as cocoa liquor (usually containing about 50 wt. % of cocoa butter). It will be understood that, in the latter case, only the cocoa butter part of a component comprising cocoa butter will contribute to the amount of component (A).

CBS designates lauric fats, i.e. short-chain fatty acid glycerides, such as those based on palm kernel and coconut, fractionated and hydrogenated. Because of poor miscibility with cocoa butter, CBS is normally used with only low-fat cocoa powder (10-12% fat).

CBEs are defined in Directive 2000/36/EC as complying with the following criteria:
a) they are non-lauric vegetable fats, which are rich in symmetrical monounsaturated triglycerides of the type POP, POSt and. StOSt;
b) they are miscible in any proportion with cocoa butter, and are compatible with its physical properties (melting point and crystallization temperature, melting rate, need for tempering step);
c) they are obtained only by the processes of refining and/or fractionation, which excludes enzymatic modification of the triglyceride structure.

Suitable CBEs include illipe, Borneo tallow, tengkawang, palm oil, sal, shea, kokum gurgi and mango kernel. CBEs are usually used in combination with cocoa butter. In one embodiment, the chocolate mass comprises no more than 5 wt. % of CBEs, CBEs also encompass a harder version also known, as cocoa butter improver (CBI), having a content of triacylglycerol containing stearic-oleic-stearic acids. CBI is specifically used in chocolate formulations having a high content of milk fat or those meant for tropical climates. According to European legislation, as long as CBEs are present at no more than 5 wt. % (to replace cocoa butter), the resulting product may still be labeled as chocolate and need not be labeled as a substitute.

CBR designates non-tempering, non-lauric fats differing in composition from cocoa butter and the tempering CBE (including CBI). It is produced by fractionation and hydrogenation of oils rich in C16 and C18 fatty acids, forming trans acids, which increases the solid phase of the fat. Suitable sources for CBR include soya, cottonseed, peanut, rapeseed and corn (maize) oil.

One or more liquid vegetable fats (other than cocoa butter and CBAs) may be employed when a liquid chocolate product is desired. Suitable vegetable fats include corn oil, cotton seed oil, rapeseed oil, palm oil, safflower oil, and sunflower oil.

The present invention is further applicable to chocolate products in which some or all of the fat is constituted by a partly or wholly non-metabolizable fat, for example Caprenin.

In a preferred embodiment of the invention, the chocolate mass comprises 25 to 35 wt. % of component (A), in particular 28 to 30 wt. % for block-molded tabletted formats and higher fat contents of ≥30 wt. % for enrobing applications.

In another preferred embodiment of the invention, the chocolate mass comprises 25 to 35 wt. % of cocoa butter as component (A) or part thereof. For solid chocolate products, the chocolate mass preferably comprises at least 25, 26, 27 or 28 wt. % and no more than 32, 31 or 30 wt. % of cocoa butter as component (A) or part thereof. For coating/enrobing applications, the chocolate mass comprises at least 28, 29 or 30 wt. % of cocoa butter as component (A) or part thereof.

CBAs, including CBEs, CBRs and CBEs, may be used at the same levels and preferred levels and for the same applications as indicated in the previous paragraph for cocoa butter, replacing the respective amount of cocoa butter. In one particular embodiment, cocoa butter in the chocolate mass may be replaced with CBAs, especially CBEs, up to a level of 5 wt. %, based on the total chocolate mass.

Milk fat (also known as butter fat) typically lowers the melting profile of conventional chocolate. Thus, in case of the overall composition and especially component (B) confers heat resistance to the chocolate product, it may be possible to add increased levels of milk fat and hence deliver a creamier tasting product. In a preferred embodiment, the chocolate mass comprises at least 1, 2 or 3 wt. % of milk fat as component (A) or part thereof, and up to 15, 12 or 10 wt. %.

Component (B) in the invention encompasses hydrated salts, hydrated sugars and hydrated sugar alcohols contained in the chocolate mass.

Hydrated salts include, for example, hydrates of alkali metal salts and hydrates of alkaline earth metal salts, such as sodium carbonate decahydrate and magnesium carbonate pentahydrate. In one embodiment of the invention, the chocolate mass comprises up to 15 wt. % of hydrated salts as component (B) or part thereof, preferably at least 0.1, 0.25 or 0.5 wt. % and no more than 15, 12 or 10 wt. %, more preferably in the range of 0.5 to 4 wt. %, even more preferably 1 to 3 wt. %.

Hydrated sugars include, for example, hydrated monosaccharides, hydrated disaccharides and hydrated polysaccharides. Monosaccharides include, for example, dextrose (glucose), fructose (levulose), galactose, xylose and ribose, disaccharides include, for example, saccharose (sucrose) and lactose, and polysaccharides include, for example, starch, glycogen and cellulose. An exemplary and preferred hydrated monosaccharide is dextrose monohydrate, and an exemplary and preferred hydrated disaccharide is lactose monohydrate. In a preferred embodiment, the chocolate mass comprises 5 to 15 wt. % of hydrated sugars as component (B) or part thereof, preferably 5 to 15 wt. % of dextrose monohydrate, more preferably 8 to 12 wt. %, even more preferably 9 to 11 wt. %.

Hydrated sugar alcohols include, for example, the hydrated forms of glycerol, sorbitol, erythritol, xylitol, mannitol, lactitol and maltitol. In one embodiment of the invention, the chocolate mass comprises up to 15 wt. % of hydrated sugar alcohols as component (B) or part thereof, preferably 5 to 15 wt. %.

Component (B) typically contains from 5 to 15 wt. % of water, based on the total amount of component (B), preferably from 5 to 10 wt. %, based on the total amount of component (B).

The chocolate mass may contain further components as are conventionally contained in chocolate products, such as cocoa solids (e.g. as part of cocoa liquor), sucrose, whey powder, milk powder, emulsifiers (for example lecithin or polyglycerol polyricinoleate (PGPR)), flavors (for example nut paste, hazelnut paste, caramel powder, and vanilla), preservatives, colorings, and color enhancers. These components can be used in the amounts in which they are conventionally used in chocolate products. Whey powder is preferably contained in an amount of at least 1, 2, 3, 4 or 5 wt. % and up to 15, 12 or 10 wt. %.

In one embodiment, the chocolate mass ingredients may also be provided, fully or in part, to the process of the invention in the form of chocolate crumb, i.e. rework ("scrap") from the chocolate manufacture, usually combined with fresh ingredients.

In the refining step, a chocolate mass comprising at least component (B) and all or part of component (A) is reduced in particle size, as is conventionally known in the art. In accordance with the invention, the temperature in the refining step does not exceed 50° C., preferably does not exceed 40° C. and more preferably does not exceed 35° C. For example, a 3-, 4- or 5-roll refiner with temperature control of the refiner rolls may be used, such as available from Buhler (Uzwil, Switzerland).

In the couching step, the refined chocolate mass is couched so as to redistribute into the fat phase the substances from the dry cocoa that create flavor. In accordance with the invention, the temperature in the refining step does not exceed 50° C., preferably does not exceed 40° C. and more preferably does not exceed 35° C. Moreover, it was found that the couching is preferably carried out for a time not exceeding 120 minutes, more preferably not exceeding 90 minutes. Commercially available conches for laboratory or industrial scale may be used. At laboratory scale, 5 kg Aoustin conches may be used to produce chocolate. Larger scale trials may be conducted with commercial scale Lipp conches. Prior to conching, it may be preferable to add to the chocolate mass or more emulsifiers and/or one or more fats, including fats not yet added as component (A) in the refining step. The conching step provides a chocolate mass which, at the couching temperature, is liquid.

In a preferred embodiment, the refining and conching steps are conducted as a combined step using, e.g., a ball mill.

In the optional tempering step, the couched chocolate mass is subjected to tempering so as to control the crystallization of the cocoa butter and CBAs (if necessary, depending on the types of the CBAs) in the chocolate mass and to obtain the optimum proportion of type V cocoa butter crystals. Tempering may not have to be carried out, depending on the fat component used. For example, CBS does not require tempering, whereas cocoa butter does. Tempering is generally known in the art, but is carried out in the present invention at a temperature not exceeding 50° C., preferably at a temperature of at least 35° C. A preferred temperature range for the tempering step is 35 to 40° C. Conventional and commercially available machinery such as an Aasted Batch Temperer may be used.

The process of the invention may or may not comprise further optional steps, separately or in combination, such as molding and cooling the processed and optionally tempered chocolate mass (to produce a molded product), packaging the tempered or molded chocolate mass, and/or thermo-curing the tempered, molded and/or packaged chocolate mass. For establishing heat resistance of the chocolate mass and, thus, producing a heat-resistant chocolate product, the optionally tempered and optionally molded and/or packaged chocolate mass is thermo-cured, as is conventionally known in the art. Thermo-curing can be effected by, e.g., maintaining the optionally tempered/molded and packaged chocolate mass at a temperature not exceeding 40° C., preferably at a temperature in the range of from 30 to 40° C., for, e.g., up to and including 6 weeks, preferably up to and including 4 weeks. It is advisable that packaged chocolate products are not weight-bearing during the thermo-curing step to better allow the heat resistance to develop and to prevent deformation of the product. As an alternative, thermo-curing can be effected in an accelerated manner by microwave treatment, as described in EP 1 673 977, for instance.

Without wishing to be bound by theory, it is contemplated that component (B) acts as an agent providing moisture to the system during processing of the chocolate mass. In particular, it is theorized that there is localized heating during refining and/or conching or later during thermo-curing, resulting in the controlled release of water of hydration from the compounds encompassed by component (B), thus generating "free water", i.e. water not chemically associated. The free water will dissolve the hydrated sugar (s) and other hydrated compounds in the chocolate mass, thus serving to propagate the dissolution of further sugar(s) and other hydrated compounds and liberation of further water of hydration, to dissolve even more of such hydrated sugars/compounds in a domino-like effect. It is contemplated that the dissolved sugars/compounds form a supersaturated solution which then re-crystallizes and forms an amorphous structure linking the sugars/compounds together so as to form a continuous network, simultaneous creating heat resistance of the resulting chocolate product.

Second Aspect of the Invention—Chocolate Product

The chocolate product according to the second aspect of the invention generally comprises (A) one or more fats selected from cocoa butter, cocoa butter alternatives, milk fat and vegetable fats which are liquid at standard ambient temperature and pressure, wherein the total amount of the fats is 15 to 35 wt. %, and (B') one or more of hydratable salts, hydratable sugars and hydratable sugar alcohols, wherein the total amount of hydratable salts, hydratable sugars and hydratable sugar alcohols is 1 to 15 wt. %.

Generally, in the chocolate product of the invention, component (A) and its proportion, its constituents and the proportions of its constituents are independently as defined in the first aspect of the invention. In a preferred embodiment, component (A) in the chocolate product corresponds to component (A) in the chocolate mass processed in the process of the first aspect of the invention.

The compounds constituting component (B') in the chocolate product of the invention generally correspond to the non-hydrated compounds encompassed by component (B) as used in the process of the first aspect of the invention. Thus, component (B') generally encompasses hydratable salts, hydratable sugars and hydratable sugar alcohols contained in the chocolate product.

Hydratable salts include, for example, alkali metal salts and alkaline earth metal salts, such as sodium carbonate and magnesium carbonate. In one embodiment of the invention, the chocolate product comprises up to 15 wt. % of hydratable salts as component (B') or part thereof, preferably at least 0.1, 0.25 or 0.5 wt. % and no more than 15, 12 or 10 wt. %, more preferably in the range of 0.5 to 4 wt. %, even more preferably 1 to 3 wt. %.

Hydratable sugars include, for example, hydratable monosaccharides, hydratable disaccharides and hydratable polysaccharides. An exemplary, preferred hydratable monosaccharide is dextrose, and an exemplary preferred hydratable disaccharide is lactose. In a preferred embodiment, the chocolate product comprises 5 to 15 wt. % of hydratable sugars as component (B') or part thereof, preferably 5 to 15 wt. % of dextrose, more preferably 8 to 12 wt. %, even more preferably 9 to 11 wt. %.

Hydratable sugar alcohols include, for example, glycerol, sorbitol, erythritol, xylitol, mannitol, lactitol and maltitol. In one embodiment of the invention, the chocolate product comprises up to 15 wt. % of hydratable sugar alcohols as component (B') or part thereof, preferably 5 to 15 wt. %.

The chocolate product of the invention preferably contains at least 1.1 wt. % of total moisture (water; $H_2O$) as determined by Karl Fischer titration, more preferably at least 1.2 wt. %, even more preferably at least 1.3 wt. %. A preferred range is from 1.3 to 3 wt. %. In a preferred embodiment, the chocolate product of the invention contains at least 2 wt. % of free moisture, as determined from the difference of associated moisture determined by thermogravimetric analysis (TGA) and total moisture.

The chocolate product may contain further components as are conventionally contained in chocolate products, such as cocoa solids (e.g. as part of cocoa liquor), sucrose, whey powder, milk powder, emulsifiers (for example lecithin or polyglycerol polyricinoleate (PGPR)), flavors (for example nut paste, hazelnut paste, caramel powder, and vanilla), preservatives, colorings, and color enhancers. These components can be used in the amounts in which they are conventionally used in chocolate products. Whey powder is preferably contained in an amount of at least 1, 2, 3, 4 or 5 wt. % and up to 15, 12 or 10 wt. %.

In one embodiment, the chocolate product ingredients may also be provided by and derived from chocolate crumb, i.e. rework ("scrap") from the chocolate manufacture, usually combined with fresh ingredients.

The chocolate product obtained in the first aspect of the invention and/or in accordance with the second aspect of the invention is preferably a heat-resistant product. It can have any conventional form, such as a block molded chocolate product (chocolate tablet) or chocolate coating.

General Definitions

A chocolate product is "heat-resistant" as defined herein when it can be exposed for prolonged periods of time to a temperature of up to 40° C., or up to 50° C., without losing its shape. Specifically, a chocolate product is regarded as heat-resistant if it exhibits a penetration force of 100 g or higher after being maintained at 50° C. for 2 hours. For comparison, a conventional, non-heat-resistant chocolate product would typically exhibit a penetration of 55 g or less.

Unless indicated otherwise, percentages indicated herein refer to percent by weight (wt. %), based on the total amount of the underlying composition, e.g., chocolate product or chocolate mass.

EXAMPLES

Analytical Methods
Determination of Total Moisture Content

The total moisture content was determined by Karl Fischer titration at 50° C. and using a 3:2:1 (v/v) mixture of methanol:chloroform:formamide to dissolve the sample.

Determination of Associated Moisture and Free Moisture 4 to 10 mg of the sample were weighed into a ceramic crucible, and the filled crucible was placed in the measurement chamber of a Perkin-Elmer STA 600 TGA/DTA analyzer at ambient temperature (25° C.). Nitrogen was used as a purge gas at a flow rate of 20 $cm^3$/min. The sample was then heated at a rate of 1° C./min, up to 180° C., monitoring the change in weight as well as the DTA signal. The weight change over the temperature range of 40 to 80° C. was determined and converted into the weight of (associated) water of hydration.

Determination of Heat Resistance

For determination of the heat resistance of a chocolate product, the penetration force was measured with a Stable Microsystems texture analyzer using a 45° cone with a speed of 1 mm/s to a depth of 3 mm.

Example 1

A chocolate base mass was prepared from the following ingredients:

| Ingredient | Amount (wt. %) |
| --- | --- |
| Sucrose | 42.268 |
| Dextrose monohydrate | 5.000 |
| CBS NH85 | 26.257 |
| Skim milk powder | 12.500 |
| Cocoa powder | 5.278 |
| Sweet whey powder | 8.000 |
| Vanillin | 0.010 |
| Lecithin | 0.687 |
| Total | 100.000 |

Refining—Flakes were prepared from the above components, except for the lecithin and an amount of the CBS corresponding to 3.77 wt. % of the total chocolate base mass, with a roll refiner at a fat content of 24.23 wt. %. The temperature at the rolls was 30° C. (pressure 22-15 bar). A particle size of 29 μm was achieved.

Conching—4295.39 g of flakes obtained in the refining step were mixed with 45.0 g of CBS and 8.19 g of lecithin, and then 128.7 g of CBS and 22.73 g of lecithin were added. In order to prevent melting of dextrose monohydrate (melting point 86° C.), the temperature during couching was minimized to 43° C. and the couching time reduced to 2 hours.

Ultraturrax treatment—As the couched mass contained an amount of lumps, an ultraturrax treatment was applied to eliminate them and homogenize the mass.

In view of the use of CBS as the main fat component, no tempering step was required.

Molding—Molding was carried out with the base mass obtained above using standard 15 g Milka molds.

Thermo-curing—Thermo-curing was carried out for 4 weeks at a temperature of 30° C.

Results—The moisture content (according to Karl Fischer) was 1.25 wt. %. At a temperature of 35° C., the sample exhibits some degree of gloss. At a temperature of 42° C., the sample is form stable and does not lose its shape upon touching. At 50° C., the sample stays perfectly intact, giving a high resistance upon touching, with not much oiling off visible. After 1 week at 50° C., the base mass exhibits a value of 2,164 g at 24° C. in the penetration test. No off flavor could be detected, and a preliminary testing demonstrated results similar to a reference sample containing only sucrose.

Example 2

Chocolate base masses were prepared from the following ingredients:

| Ingredient | Standard (reference) (wt. %) | 10% Dextrose monohydrate (wt. %) |
| --- | --- | --- |
| Cocoa liquor | 10.200 | 10.200 |
| Sucrose | 45.303 | 37.303 |

-continued

| Ingredient | Standard (reference) (wt. %) | 10% Dextrose monohydrate (wt. %) |
|---|---|---|
| Dextrose monohydrate | 0.000 | 10.000 |
| Skim milk powder | 12.500 | 12.500 |
| Anhydrous milk fat | 4.800 | 3.800 |
| Cocoa butter | 17.500 | 16.500 |
| Sweet whey powder | 8.000 | 8.000 |
| Hazelnut paste | 1.000 | 1.000 |
| Lecithin (soy) | 0.687 | 0.687 |
| Vanillin | 0.010 | 0.010 |
| Total | 100.000 | 100.000 |
| Fat content | 29.05 | 27.05 |

Refining—Flakes were prepared from the above components, except for the cocoa butter, hazelnut paste and lecithin, with a roll refiner at a fat content of 24.5 wt. %. Pre-refining took place by applying 2 to 3 bar at 20° C., while 18 to 20 bar was applied during refining at 25° C.

Conching—Conching was carried out on a 5 kg batch Aoustin conche using the following protocol (PGPR added for reducing the viscosity of the resulting chocolate product for molding):

| Time (min.) | Action | Direction | Speed (rpm) | Temperature (° C.) |
|---|---|---|---|---|
| 0 | load flakes | right | 50 | 40 |
| 30 | add cocoa butter, hazelnut paste, lecithin | right | 70 | 35 |
| 60 | add PGPR (0.5%) | right | 70 | 30 |
| 90 | unload mass | | | |

During conching, a plastic lid was used to avoid loss of moisture from the mixture.

Molding/tempering—The standard mass was seeded with 0.4 wt. % of a cocoa butter suspension. Mixing was carried out by hand, and the mixture was filled in molds of 100 g or 15 g.

Packaging—The product was packed in thermally sealed aluminum foil bags and stored at. 16° C. prior to further analysis.

Thermo-curing—The resulting packaged product was thermo-cured by maintaining it at 30° C. for four weeks.

Results—The 10% dextrose monohydrate packaged product was maintained at 50° C. for 2 hours. Heat resistance was determined by means of a texture analyzer (penetration method). In total, 5 different tablets of 15 g each were evaluated, providing the following overall performance (6 measuring points for each tablet):

Tablet 1—250 g
Tablet 2—300 g
Tablet 3—310 g
Tablet 4—270 g
Tablet 5—290 g

The penetration force for a corresponding non-heat resistant chocolate is less than 25 g.

The invention claimed is:

1. A process for the manufacture of a heat resistant chocolate product comprising the steps of:
   (i) combining at least
      (A) one or more fats selected from cocoa butter, cocoa butter alternatives, milk fat and vegetable fats which are liquid at standard ambient temperature and pressure, and
      (B) one or more of hydrated salts, hydrated sugars and hydrated sugar alcohols, to form a chocolate mass having a total amount of fats of 15 to 35 wt. % and total amount of hydrated salts, hydrated sugars, and hydrated sugar alcohols of 1 to 15 wt. %;
   (ii) refining the chocolate mass; and
   (iii) conching the chocolate mass to a liquid;
      wherein the temperature of the chocolate mass during refining and conching does not exceed 50° C., and wherein the chocolate mass comprises 1 to 15 wt. % of dextrose monohydrate as component (B) or part thereof.

2. The process according to claim 1, wherein the temperature of the chocolate mass in the process does not exceed 40° C.

3. The process according to claim 1, wherein refining and conching are conducted as a combined step.

4. The process according to claim 1, wherein conching is conducted for a time not exceeding 120 minutes.

5. The process according to claim 1, wherein the chocolate mass comprises 5 to 15 w. % of dextrose monohydrate as component (B) or part thereof.

6. The process according to claim 1, further comprising tempering the chocolate mass at a temperature not exceeding 50° C.

7. The process according to claim 1, wherein the chocolate product is a block molded chocolate or a chocolate coating.

8. The process according to claim 6, further comprising, after the tempering step, a thermo-curing step at a temperature not exceeding 40° C.

9. The process according to claim 8, wherein the thermo-curing step is carried out at a temperature in the range of from 30 to 40° C., wherein the chocolate product is load-bearing.

* * * * *